United States Patent [19]
Berns et al.

[11] Patent Number: 5,489,201
[45] Date of Patent: Feb. 6, 1996

[54] PLASTIC TILE CORRUGATOR AND MOLD BLOCKS

[75] Inventors: John S. Berns, Cleveland; Heinrich Dickhut, Charleston, both of Tenn.

[73] Assignee: Cullom Machine Tool & Die, Inc., Cleveland, Tenn.

[21] Appl. No.: 215,492

[22] Filed: Mar. 21, 1994

Related U.S. Application Data

[62] Division of Ser. No. 48,355, Apr. 15, 1993, abandoned, which is a continuation of Ser. No. 338,894, Nov. 14, 1994.

[51] Int. Cl.$^6$ ............................. B29C 47/90; B29C 53/30
[52] U.S. Cl. ................................. 425/233; 264/209.300; 264/508; 264/568; 425/326.100; 425/336; 425/370; 425/371; 425/388; 425/392; 425/395; 425/396; 425/453
[58] Field of Search ...................... 425/233, 325, 425/326.1, 336, 371, 388, 392, 396, 453, 370, 395; 264/508, 568, 209.3

[56] References Cited

U.S. PATENT DOCUMENTS

| | | |
|---|---|---|
| 2,866,230 | 12/1958 | Holte . |
| 2,882,955 | 4/1959 | Osborne et al. . |
| 3,181,941 | 5/1965 | Moreau et al. . |
| 3,262,159 | 7/1966 | Falkenau et al. . |
| 3,306,962 | 2/1967 | Pepper . |
| 3,425,092 | 2/1969 | Jun Taga . |
| 3,538,209 | 11/1970 | Hegler . |
| 3,677,676 | 7/1972 | Hegler . |
| 3,751,541 | 8/1973 | Hegler . |
| 3,776,679 | 12/1973 | Hegler . |
| 3,834,853 | 9/1974 | Bequet et al. . |
| 3,864,446 | 2/1975 | Maroschak . |
| 3,891,733 | 6/1975 | Maroschak . |
| 3,910,713 | 10/1975 | Maroschak . |
| 3,924,992 | 12/1975 | Hegler . |
| 3,976,414 | 8/1976 | Hegler et al. . |
| 3,981,663 | 9/1976 | Lupke . |
| 3,994,644 | 11/1976 | Hegler et al. . |
| 3,996,323 | 12/1976 | Hegler et al. . |
| 4,055,098 | 10/1977 | Leloux . |
| 4,136,143 | 1/1979 | Lupke et al. . |
| 4,145,387 | 3/1979 | Hegler et al. . |
| 4,165,214 | 8/1979 | Lupke et al. . |
| 4,180,357 | 12/1979 | Lupke et al. . |
| 4,184,831 | 1/1980 | Hegler et al. . |
| 4,199,314 | 4/1980 | Lupke et al. . |
| 4,212,618 | 7/1980 | Hegler et al. . |
| 4,226,580 | 10/1980 | Lupke et al. . |
| 4,231,834 | 11/1980 | Gonzalez . |
| 4,292,014 | 9/1981 | Lupke et al. . |
| 4,303,104 | 12/1981 | Hegler et al. . |
| 4,305,703 | 12/1981 | Lupke et al. . |
| 4,319,872 | 3/1982 | Lupke et al. . |

(List continued on next page.)

FOREIGN PATENT DOCUMENTS

| | | |
|---|---|---|
| 609745 | 11/1960 | Canada . |
| 1019916 | 11/1977 | Canada . |
| 1189269 | 6/1985 | Canada . |
| 2001703 | 4/1991 | Canada . |
| 2018394 | 12/1991 | Canada . |
| 1298051 | 3/1992 | Canada . |
| 0081298 | 6/1983 | European Pat. Off. . |
| 0381938 | 8/1990 | European Pat. Off. . |
| 0420019 | 4/1991 | European Pat. Off. . |
| 1181531 | 6/1959 | France . |
| WO90/14208 | 11/1990 | WIPO . |
| WO91/06419 | 5/1991 | WIPO . |

*Primary Examiner*—Jay H. Woo
*Assistant Examiner*—Joseph Leyson
*Attorney, Agent, or Firm*—Wood, Phillips, VanSanten, Clark & Mortimer

[57] ABSTRACT

A machine for making plastic tubing including a plurality of separate carriages for carrying mold blocks about the continuous path. First and second wheel pairs on opposite sides of each carriage ride on first and second tracks respectively through a molding section of the path. An offset wheel is disposed between the wheels of each pair and rides on guide tracks associated with and facing oppositely to the first and second tracks respectively through the molding section.

6 Claims, 9 Drawing Sheets

U.S. PATENT DOCUMENTS

| | | |
|---|---|---|
| 4,325,685 | 4/1982 | Lupke et al. . |
| 4,365,948 | 12/1982 | Chaplain . |
| 4,374,079 | 2/1983 | Fouss et al. . |
| 4,439,130 | 3/1984 | Dickhut et al. . |
| 4,449,910 | 5/1984 | Leloux . |
| 4,492,551 | 1/1985 | Hegler et al. . |
| 4,500,284 | 2/1985 | Lupke . |
| 4,504,206 | 3/1985 | Lupke et al. . |
| 4,510,013 | 4/1985 | Lupke et al. . |
| 4,521,270 | 6/1985 | Lupke . |
| 4,534,923 | 8/1985 | Lupke . |
| 4,545,751 | 10/1985 | Lupke . |
| 4,553,923 | 11/1985 | Lupke . |
| 4,555,230 | 11/1985 | Lupke . |
| 4,681,526 | 7/1987 | Lupke . |
| 4,689,174 | 8/1987 | Lupke . |
| 4,712,993 | 12/1987 | Lupke . |
| 4,718,844 | 1/1988 | Dickhut et al. . |
| 4,731,138 | 3/1988 | Lupke . |
| 4,770,618 | 9/1988 | Lupke . |
| 4,787,598 | 11/1988 | Rahn et al. . |
| 4,936,768 | 6/1990 | Lupke . |
| 4,952,362 | 8/1990 | Jarvenkyla et al. . |
| 4,995,800 | 2/1991 | Lupke . |
| 5,002,478 | 3/1991 | Lupke . |
| 5,023,029 | 6/1991 | Lupke . |
| 5,059,109 | 10/1991 | Dickhut et al. . |

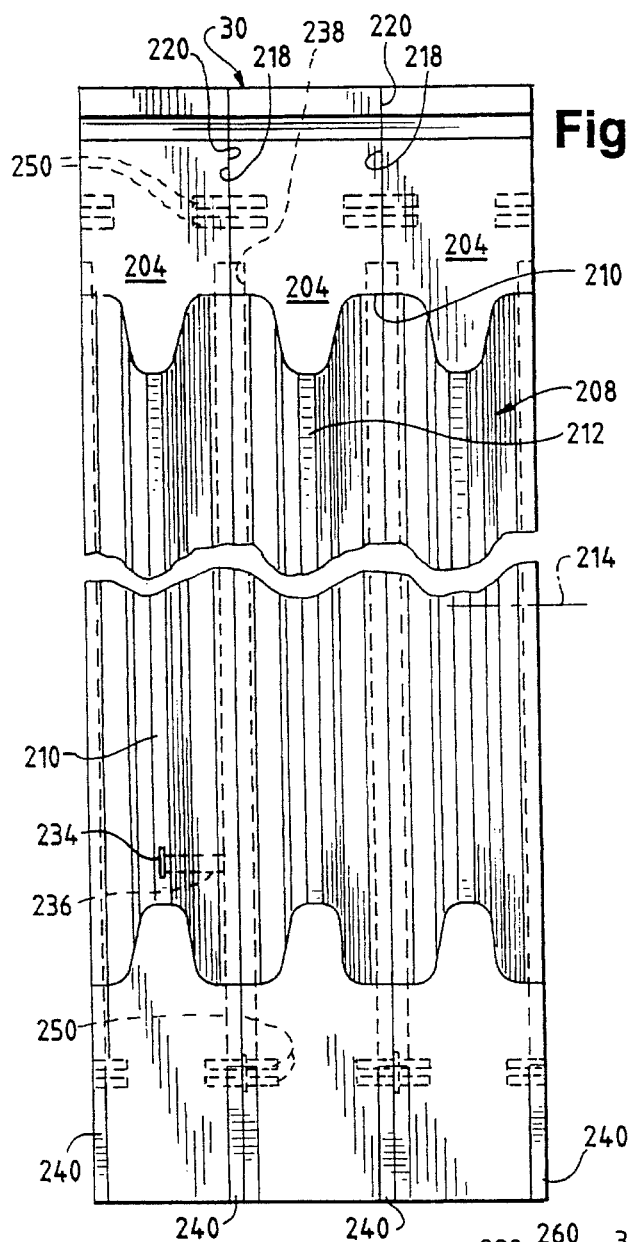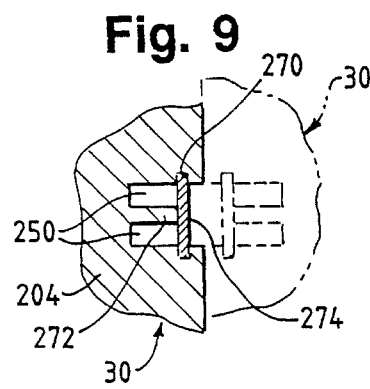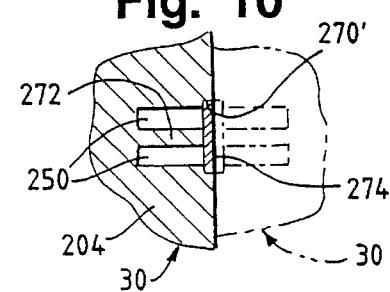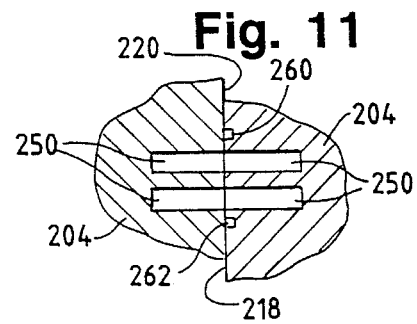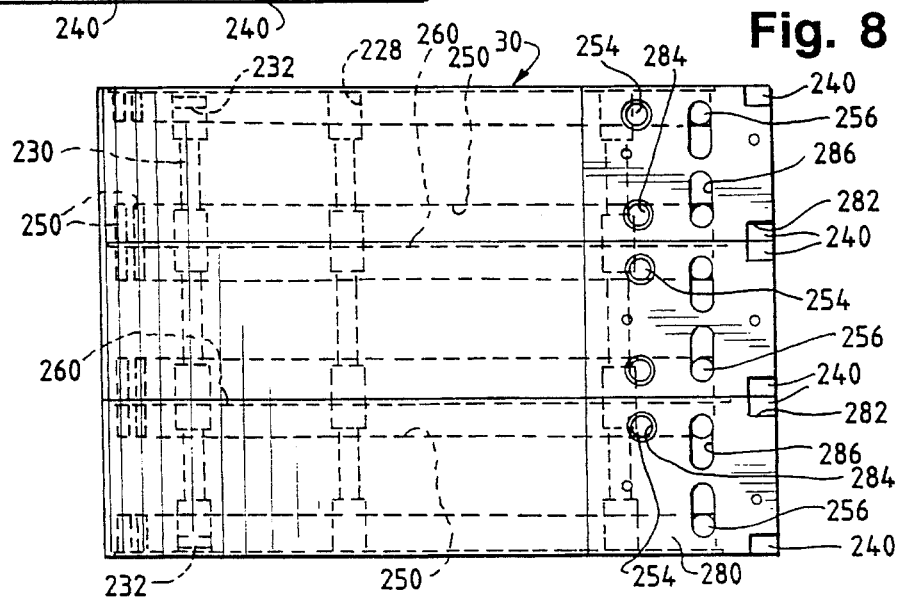

PLASTIC TILE CORRUGATOR AND MOLD BLOCKS

RELATED APPLICATION

This is a divisional application to Ser. No. 08/048,355, filed Apr. 15, 1993. Ser. No. 08/048,355 has been abandoned in favor of file wrapper continuation application Ser. No. 08/338,894, filed Nov. 14, 1994.

BACKGROUND OF THE INVENTION

1. Technical Field

The present invention is directed toward corrugators, and more particularly toward corrugators for making corrugated plastic tubing.

2. Background Art

A well known method for manufacturing corrugated pipes is to extrude a tube of thermoplastic from a head and then conform that tube to the interior of a corrugated mold tunnel formed by mold blocks. The mold blocks typically come in pairs and mate together to form a portion of the mold tunnel, and the thermoplastic is either blown into its shape (by pressure created within the mold tunnel) or by vacuum (where vacuum draws the air from around the mold tunnel).

Structures which have been used in the vacuum method of manufacture are illustrated in U.S. Pat. Nos. 4,319,872, 4,439,130, and 4,718,844. These patents all address the problem of drawing a uniform, strong vacuum around the entirety of the mold blocks which are continually moving during the molding process, As can be seen from these structures, it is difficult to inexpensively form any such mold block.

Certain problems naturally occurring in all such machines are exaggerated in machines which are used to make larger diameter tubes (for example, up to four feet in diameter and more).

Conforming the thermoplastic to the larger diameter mold blocks with a uniformity of wall thickness can be difficult.

Moving and properly aligning multiple mold blocks is also naturally more difficult with larger diameter mold blocks due to the mere size and weight of the parts involved and their interaction with other components. In clamshell type machines, for example (with the mold blocks supported on a carriage on one side), any forces incurred on the other side of the mold blocks naturally involves a larger moment arm about the carriages, with the result being that such structures can be more susceptible to "sawtooth" type arrangements through the mold tunnel, with successive mold blocks being tilted slightly rather than perfectly aligned with the axis of the mold tunnel.

The present invention is directed toward overcoming one or more of the problems set forth above.

SUMMARY OF THE INVENTION

In one aspect of the present invention, a machine for making plastic tubing is provided including first and second guide tracks on the machine defining a continuous path, and third and fourth guide tracks associated with and facing oppositely to the first and second tracks respectively through a molding section of the continuous path. A plurality of carriages carry a pair of mold blocks pivotable about an axis into mating engagement with one another along a molding section of the continuous path to form an axial portion of a mold tunnel in the molding section. The carriages each include a carriage body with a first wheel pair on one side and a second wheel pair on the other side, the first and second wheel pairs riding on the first and second tracks respectively through the path molding section. A first offset wheel is secured to the carriage body between the wheels of the first pair and rides on the third track through the molding section. A second offset wheel is secured to the carriage body between the wheels of the second pair and rides on the fourth track through the path molding section.

It is an object of the present invention to provide a corrugator for making plastic tubing which may be reliably operated.

It is another object of the present invention to provide a corrugator which will reliably operate to make tubing of various diameters, including large diameter tubing.

It is still another object of the present invention to provide a corrugator which will operate as above at minimum cost.

It is yet another object of the present invention to provide a corrugator which will reliably form tubing precisely to the desired configuration with alternating lands and grooves.

Another object of the present invention is to provide a corrugator which may be operated at relatively high speeds over long periods of time without degrading the quality of the produced tubing.

BRIEF DESCRIPTION OF THE DRAWINGS

FIG. 7 is a partially broken side view of the mold block of FIG. 6;

FIG. 8 is a side view of the mold block of FIG. 6;

FIG. 9 is a partial cross-sectional view showing the cooling water channels on one side of a mold block, with an abutting mold block shown in phantom;

FIG. 10 is a partial cross-sectional view similar to FIG. 9 but showing an alternative cooling water channel structure for one side of a mold block;

FIG. 11 is a partial cross-sectional view showing the cooling water channels as defined between sub-blocks of a mold block;

DESCRIPTION OF THE PREFERRED EMBODIMENT

Figure 1:
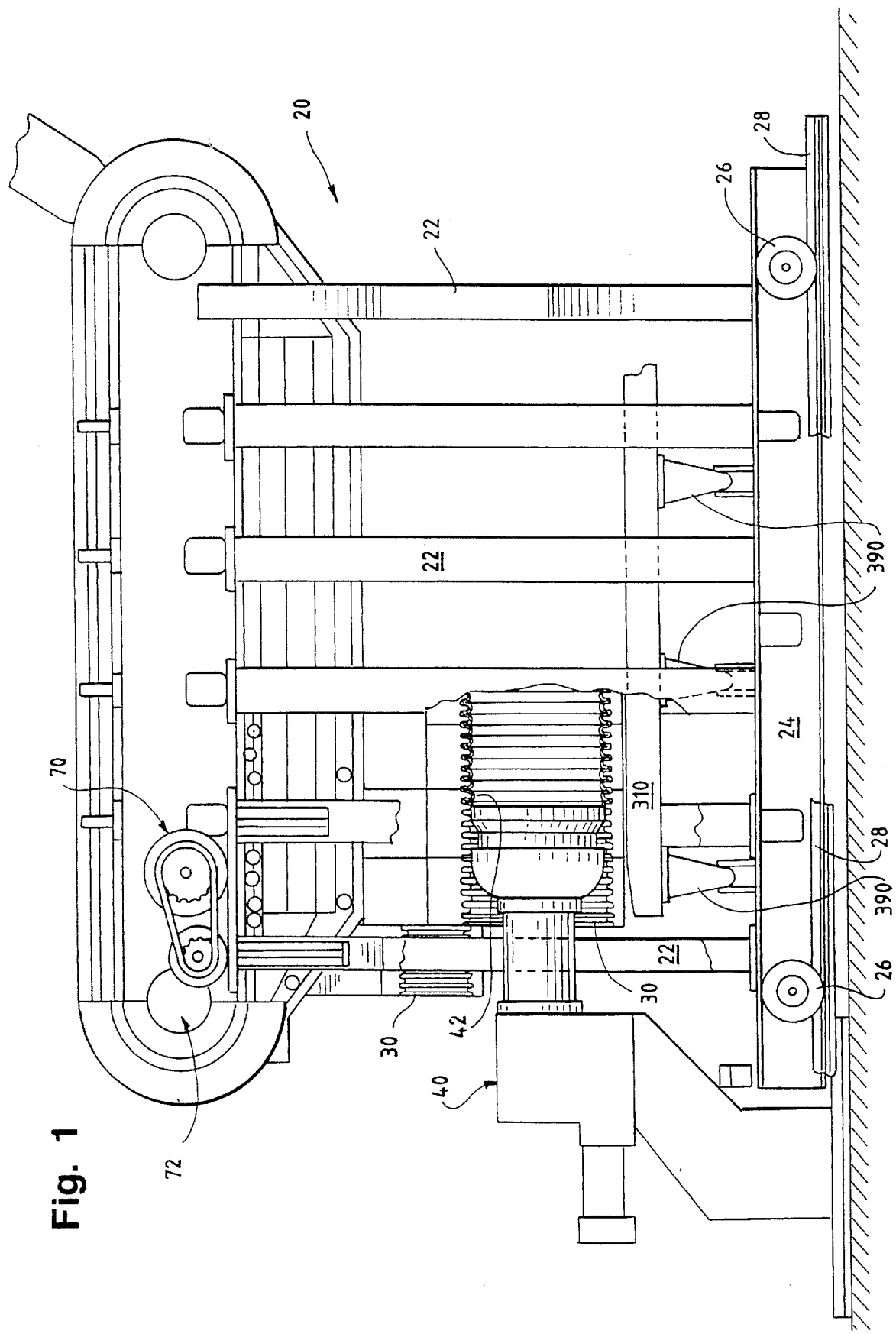
FIG. 1 is a side elevation view of a corrugator embodying various aspects of the present invention.
Figure 2:
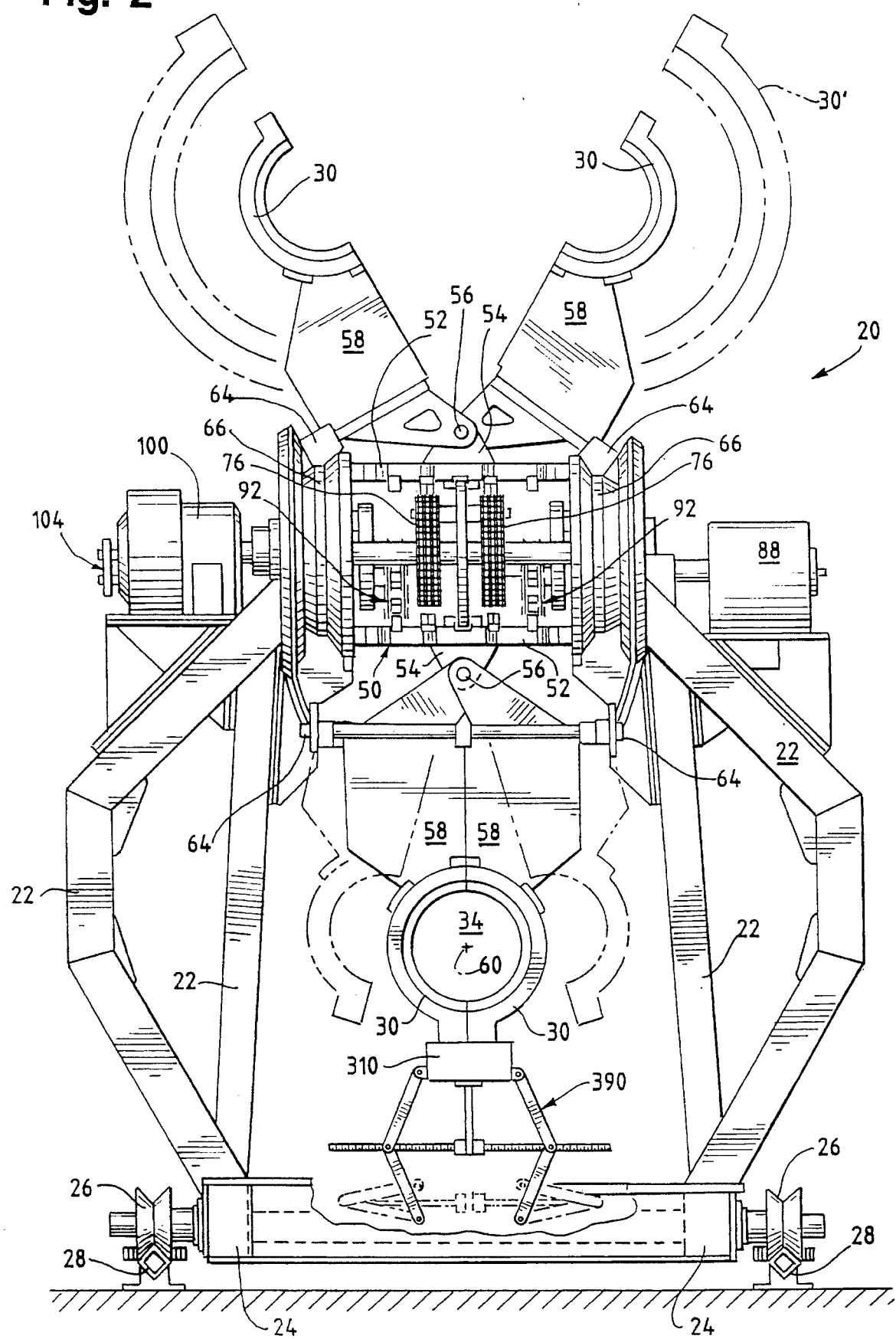
FIG. 2 is an end view of the corrugator of FIG. 1 showing different positions of the mold blocks in phantom.

A corrugator 20 embodying the present invention is shown in particular in FIGS. 1–4. The corrugator 20 includes a frame 22 supported on horizontal support beams 24. Preferably, the support beams 24 include suitable wheels 26 to permit the corrugator to be moved when needed. As best seen in FIG. 2, a rail structure 28 on which the wheels 26 is one such configuration which will accommodate the size and weight of the corrugator 20.

The corrugator 20 generally defines a continuous endless path 32 (see particularly FIG. 3) for circulating suitable corrugated mold blocks 30 to form a mold tunnel 34 through the molding section of the corrugator 20 in alignment with an extruder for thermoplastic material. The extruder 40 (shown somewhat schematically in FIG. 1) supplies a continuous annular sheet of thermoplastic material 42 which is drawn into the corrugated tunnel defined by the mold blocks 30 (as described in greater detail hereafter) to form the desired corrugated tube. Such tubes have numerous uses, with larger diameter tubes (up to four feet in diameter and more) commonly being used, for example, for drainage.

As best seen in FIG. 2, the mold blocks 30 are suitably secured to carriages 50. Specifically, the carriage 50 includes a carriage body 52 having two dogs 54 projecting therefrom and defining a clamshell pivot 56. Pivotally secured to the clamshell pivot 56 are pivotal mounting members 58 to which the mold blocks 30 are secured. Preferably, the mounting members 58 are relatively easily removable from the clamshell pivot 56, so that different size mounting members can be used where required for different size mold blocks. That is, as will be appreciated, the central axis of the annular material 42 produced by the extruder 40 must generally correspond to the central axis 60 (see FIG. 2) of the mold tunnel 34. This alignment is important to producing proper tubes since misalignment can result in nonuniform tube thickness (with the material on one side thicker than that on the other side). By using different mounting members depending upon the particular mold blocks being used, an operator can readily change from one size to another without having to tediously realign the extruder 40 each time a switch in size occurs. That is, the operator merely has to mount the right mold blocks and mounting members and the mold tunnel axis 60 will naturally correspond to the axis of the extruder 40 without any possibility of misalignment. (The need for such different size mounting members is perhaps best illustrated by a comparison of the small mold blocks 30 shown in FIG. 2 to the larger mold blocks 30' shown in phantom at the top of FIG. 2).

As described in further detail below, the carriage body 52 follows a track which suitably guides it around the oval continuous path 32. The mounting members 58 also include guide wheels 64 which follow clamshell guide tracks 66 to suitably pivot the mounting members 58 to open and close the mold blocks 30 as necessary. That is, the mold blocks 30 are held apart as they approach the mold tunnel 34 in order that they will be clear of the extruder 40. The blocks 30 are then closed over the extruder 40 and the annular material 42 produced thereby to form a portion of the mold tunnel 34. The blocks 30 are maintained in this mating position (shown in the bottom of FIG. 2) along the length of the mold tunnel 34. At the end of the mold tunnel 34, the mounting members 58 pivot out to separate the mold blocks 30 so that they will clear the tube formed therein. The carriage 50 then circles up around the end of the continuous path 32 and returns along the top of the path 32 to the beginning of the mold tunnel 34 as described hereafter in greater detail.

The advantageous drive structure for moving the carriages 50 about the continuous path 32 of the corrugator 20 of the present invention will now be discussed with particular reference to FIGS. 1–4.

Figure 3:
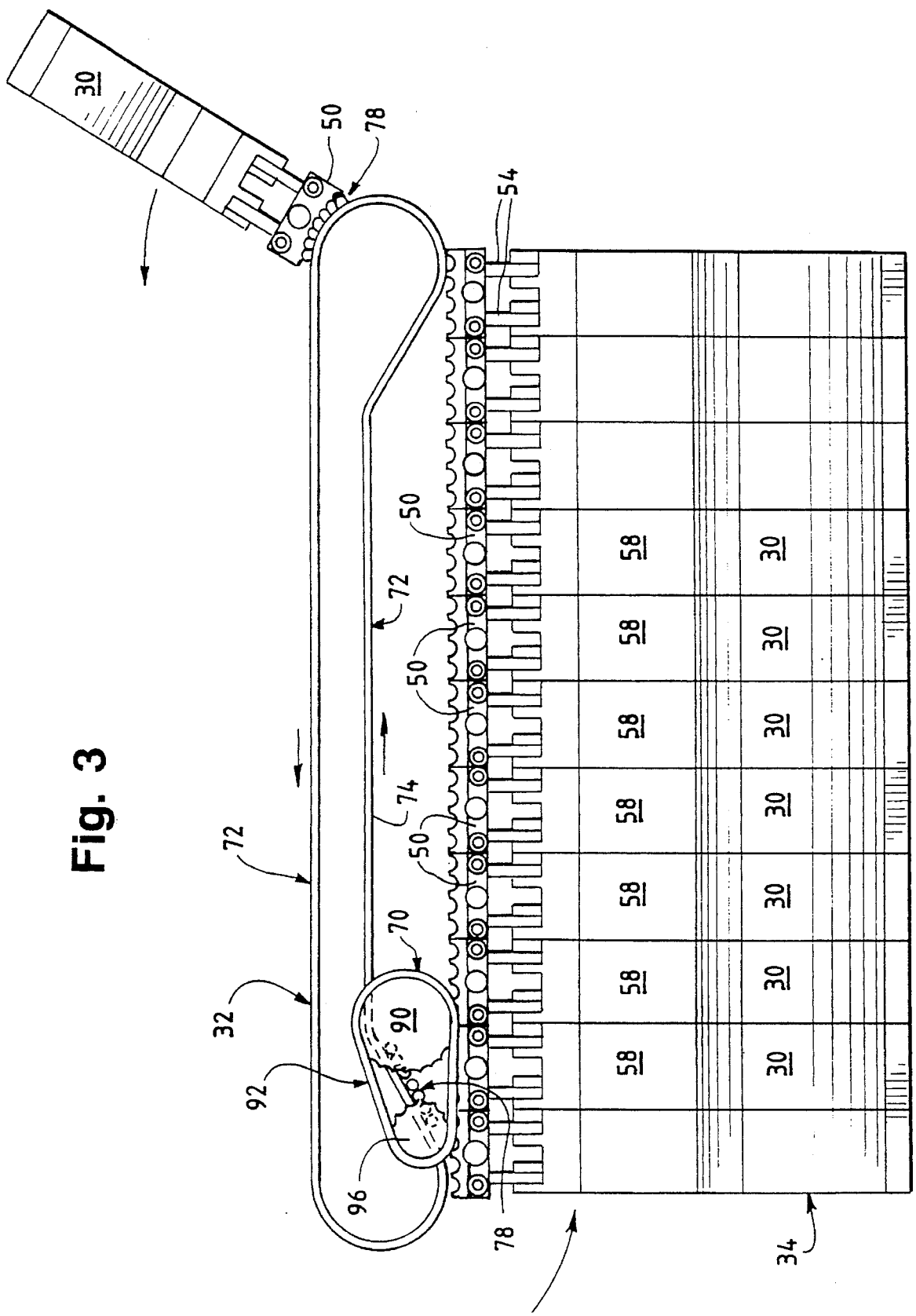
FIG. 3 is a generally schematic side view of the corrugator drive of the present invention.

Specifically, as schematically illustrated in FIG. 3, two separate drives are provided: a mold train drive 70 and a shuttle drive 72.

The mold train drive 70 is disposed at the beginning of the mold tunnel 34 and operates at a substantially constant speed (depending on the output of the extruder 40) to relatively slowly drive the carriages 50 and associated mold blocks 30 at the beginning of the mold tunnel 34 to effectively drive all of the carriages 50 in the mold train at a constant speed.

The shuttle drive 72 follows the carriage continuous path 32 for over half of its length, with the remaining portion 74 of the shuttle drive 72 being spaced from the path (along a substantial portion of the length of the molding section). The shuttle drive 72 includes two continuous chains 76 (see FIG. 2) laterally spaced on opposite sides of the carriage 50, which chains 76 are guided by suitable idlers to follow the path shown in FIG. 3. Each chain 76 includes two sets of dogs 78 which are equally spaced halfway around the chain (the dogs 78 of each chain being aligned with the dogs 78 of the other chain, as the two chains 76 operate in tandem). As described in greater detail hereafter with respect to FIG. 5, the carriages 50 contain shuttle racks 80 which will engage a set of dogs 78 when along those portions of the shuttle drive 72 which follows the carriage continuous path 32. The shuttle drive 72 operates at a variable speed depending on its position during operation.

It should thus be understood that the drive structure for the corrugator 20 will operate as follows. It should be understood that while both the mold train drive 70 and the shuttle drive 72 include dual chains operating in tandem as described more fully hereafter, for convenience the below discussion of operation of these drives will refer to a singular chain and associated parts.

Specifically, when one set of dogs 78 of the shuttle drive 72 engage a shuttle rack 80 and associated carriage 50 at the beginning of the molding section with the carriage 50 also connected to the mold train drive 70, the shuttle drive 72 and mold train drive 70 are driven at substantially the same speed. As the one set of dogs 78 thus follows the carriage 50 at the speed of the mold train drive 70, the other set of dogs 78 approach the shuttle path 32 at the end of the molding section and engage a shuttle rack 80 and associated carriage 50 at the end of the molding section.

This synchronous operation of the two drives 70, 72 continues until the one set of dogs 78 moves onto the spaced portion 74 of the shuttle drive 72 and thereby disengages the shuttle rack 80. At that point, the shuttle drive 72 engages only the shuttle rack 80 and associated carriage 50 at the end of the molding section, with the associated mold blocks 30 of the engaged carriage 50 at this point preferably having pivoted out at least clear of the corrugations of the formed tube.

When this position is detected in a suitable manner such as described in greater detail hereafter, the shuttle drive 72 is accelerated to bring the engaged carriage 50 (shown in the upper right of FIG. 3) back to the beginning of the mold train.

As the engaged carriage 50 thereafter approaches the beginning of the molding section, the shuttle drive 72 decelerates gradually until it is once again operating at the same speed as the mold train drive 70 at substantially the point at which the shuttle drive engaged carriage 50 is engaged again by the mold train drive 70.

With the above described operation, it should now be apparent that the corrugator 20 can be operated with a minimal number of carriages 50 and mold blocks 30. Given the expense involved with both, and particularly the expense of the multiple sets of mold blocks 30 required in most installations, these savings are significant. Of course, such cost savings translate into reduced cost of the tubes formed by corrugators 20 embodying the present invention.

It should also be understood that it would be within the scope of the present invention to use more than two sets of dogs 78 on each shuttle drive chain 76. In particular, four sets of dogs could be evenly spaced about the length of each chain 76, in which case operation would be similar to that described above except that generally two carriages 50 would be shuttled, where each such shuttled carriage 50 would decelerate approximately halfway through its shuttle path to the speed of the mold train while the other shuttle is dropped off. Once the first shuttled carriage is disengaged from the shuttle drive dogs at the beginning of the mold train, the following decelerated carriage 50 would then be accelerated again for travel through the last half of its shuttle path. While such an arrangement would theoretically require one more set of mold blocks 30 than the previously described configuration, it would nevertheless provide the basic advantages of the invention of substantially reducing the required number of costly mold blocks. Further, such a configuration would accommodate corrugators 20 in which the speed of the mold train is so fast that the shuttle drive 72 would not be capable of shuttling a carriage 50 through the entire shuttle path in a timely enough fashion (i.e., the mold train is continuously moving forward, and if the shuttle is not returned quickly enough the shuttled carriage 50 would not be connected to the mold train drive 70 in the required position with its mold blocks 30 abutting the mold blocks 30 of the next carriage 50). Such a configuration might also allow use of a less expensive motor for the shuttle drive, to thereby to some degree offset any increased cost associated with the requirement of one more set of mold blocks 30.

Figure 4:
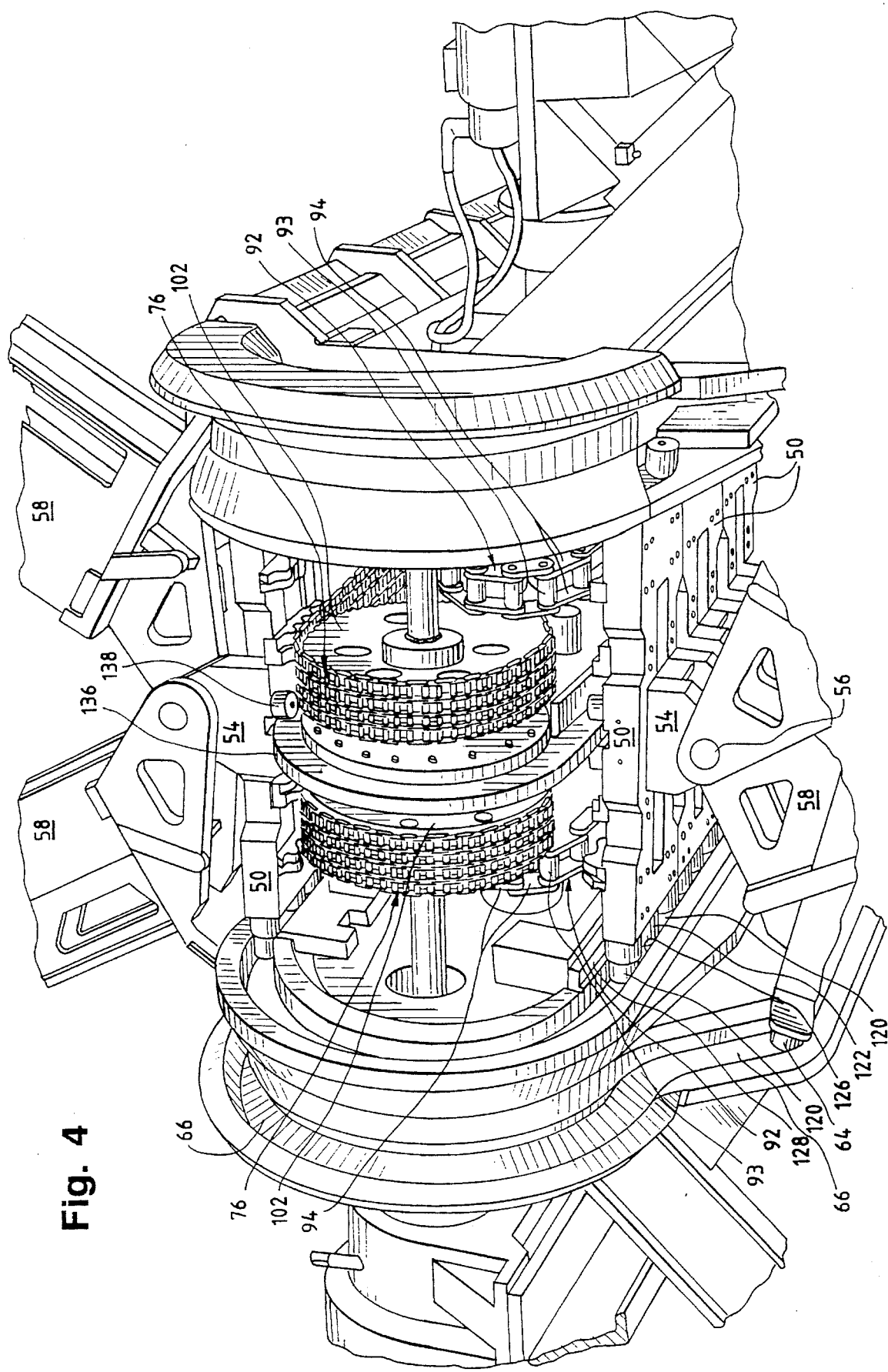
FIG. 4 is a perspective view of one end of the corrugator drive.

Reference will now be made particularly to FIGS. 1–4, and particularly FIGS. 2 and 4, for further details of a preferred embodiment of the mold train drive 70 and the shuttle drive 72 operating as described above.

Specifically, the mold train drive 70 includes a suitable drive motor 88 which rotates drive sprockets 90 (on opposite sides of the corrugator 20, laterally spaced outwardly from the shuttle drive chains 76). The drive sprockets 90 each drive a chain 92 having transverse pins 93 connecting two sets of laterally spaced links 94. The chains 92 are also driven around an idler sprocket 96 positioned so that the bottom forward path of the chains 92 is parallel to and adjacent to the carriage path 32 at the beginning of the molding section.

In a preferred embodiment of the shuttle drive 72, the axle of the idler sprockets 96 is spring loaded in a suitable manner so as to soften the jarring which could occur in the drives 70, 72 during the transition when a shuttled carriage 50 still connected to the shuttle drive 72 is also engaged by the mold train drive 70 at the beginning of the molding section.

The shuttle drive 72 includes a suitable variable speed drive motor 100 capable of operating to accelerate and decelerate the shuttle drive 72 as described above. The shuttle drive motor 100 drives a set of drive sprockets 102 which drive the multilink shuttle drive chains 76 which, as previously described, pass around suitable idlers located along the length of the corrugator 20 so as to follow the path shown in FIG. 3.

Coordinated operation of the mold train drive 70 and shuttle drive as previously discussed can be accomplished in a suitable manner. In a preferred embodiment of the present invention, suitable encoders 104 (see FIG. 2) can be used to count the rotations of the shuttle drive motor 100 to provide feedback as to the position of the shuttle drive 72. Since the number of links in the shuttle chains 76 and the number of sprockets on the drive sprockets 102 can be readily determined, counting the rotations of the drive sprockets 102 will provide reliable feedback in this regard. Alternatively, sensors could also be provided along the shuttle drive 72 to directly sense its position. In either event, suitable feedback can be provided to a control unit which could automatically accelerate and decelerate the shuttle drive 72 when appropriate as discussed above.

Figure 5:
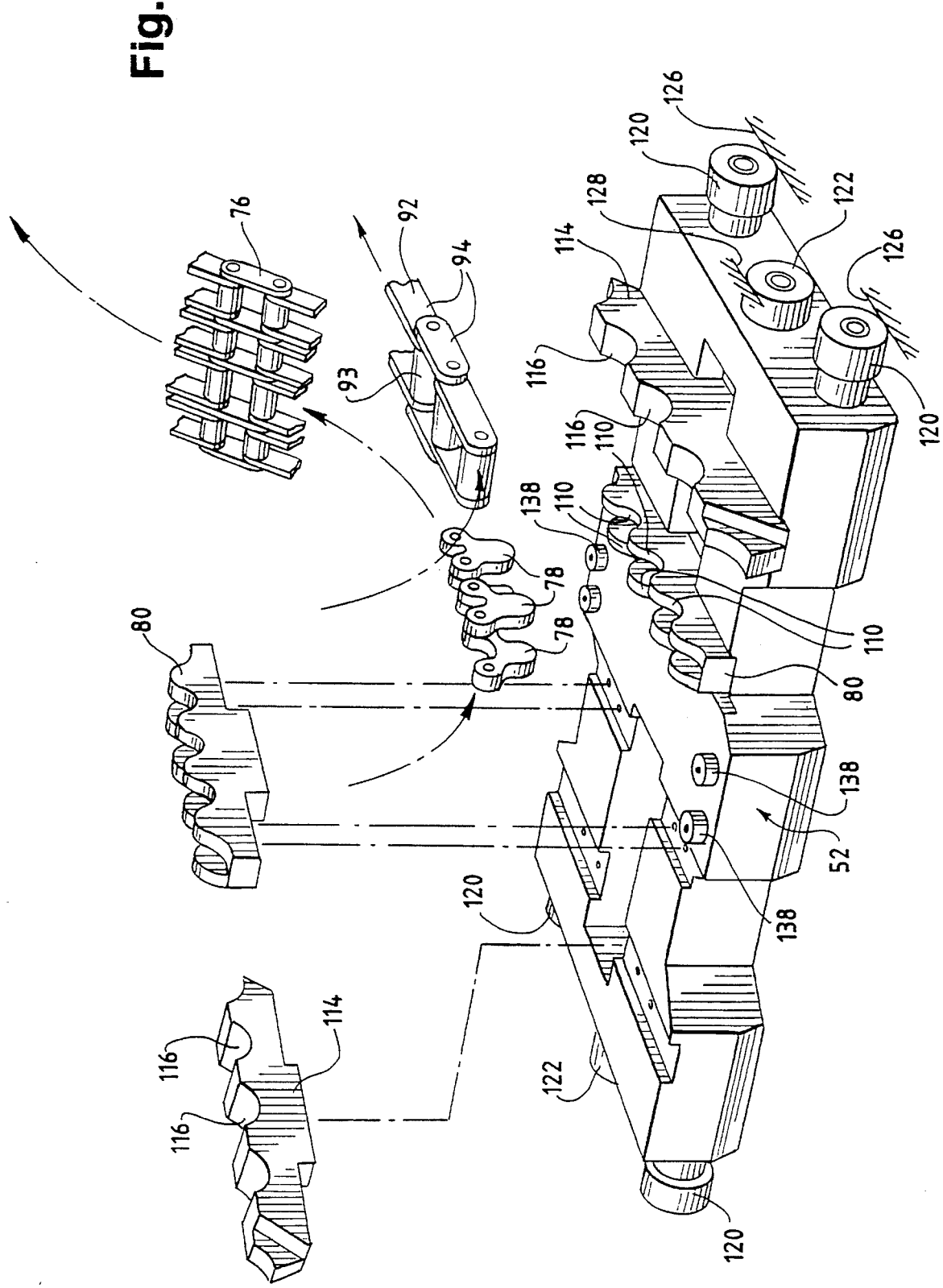
FIG. 5 is a perspective exploded view of a drive and carriage body for carrying clam-shell type pivoting mold blocks about the continuous path of the corrugator.
Figure 6:
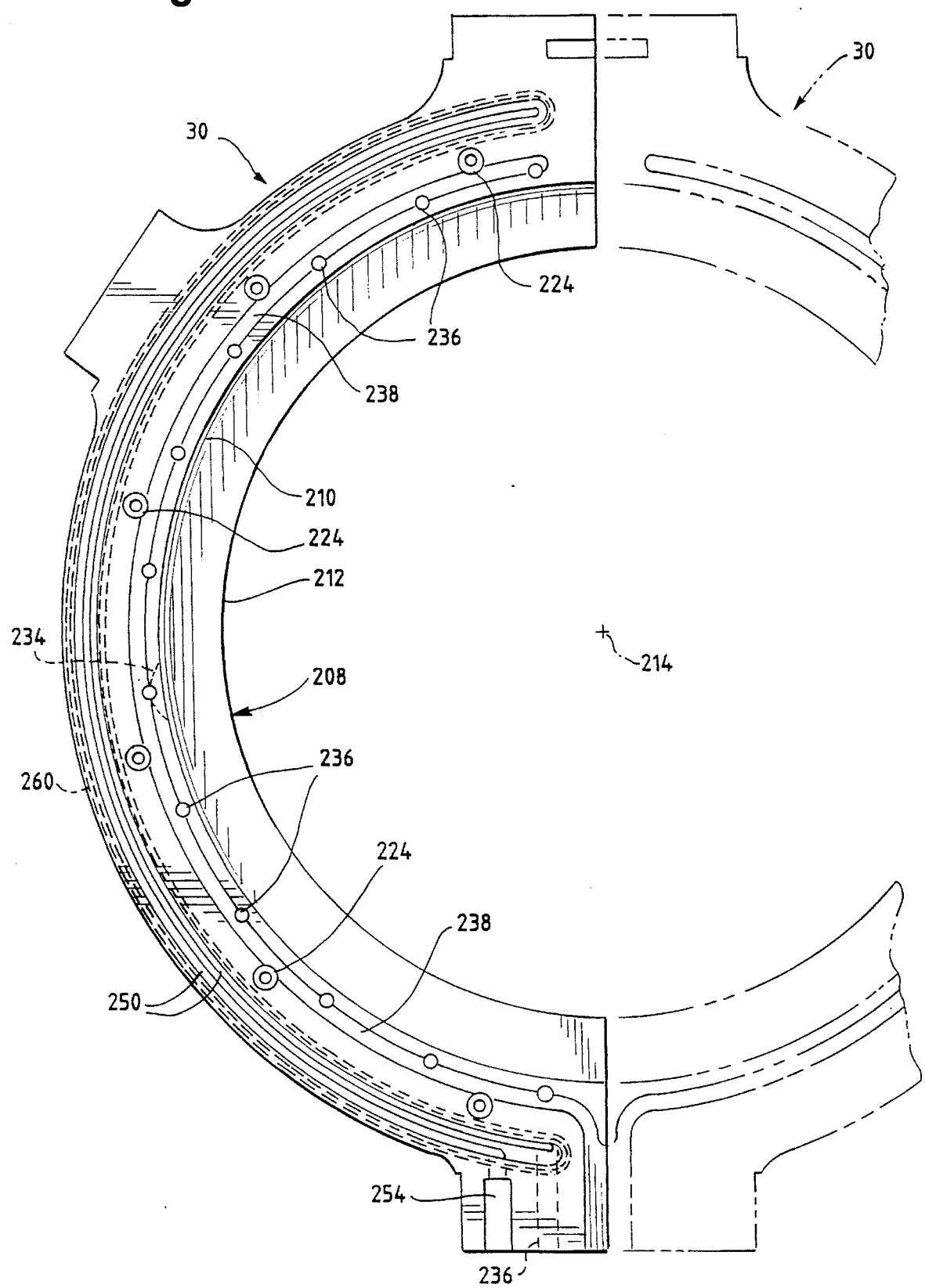
FIG. 6 is an end view of one mold block, shown in a mated position with a second mold block illustrated in phantom.

The drive structure of the corrugator 20 is also illustrated in FIG. 5. Specifically, FIG. 5 illustrates the drive engaging side of a carriage body 52. Shuttle racks 80 having alternating rows of grooves 110 are secured to both sides of the body 52 in lateral alignment with the shuttle drive chain 76. Four alternating shuttle drive dogs 78 are illustrated in FIG. 5, which dogs 78 are suitably interlaced with the shuttle drive chain 76 so that they will engage the grooves 110 of the shuttle racks 80 in any shuttle chain position adjacent to the carriage path 32. Of course, since each shuttle drive chain 76 includes only two sets of dogs 78 as previously described, the shuttle drive 70 will generally engage no more than one or two carriages 50 at any given time.

Mold drive racks 114 are similarly secured to both sides of the body 52 outside of the shuttle racks and in lateral alignment with the mold train drive chain 92. Each of the mold drive racks 114 includes a series of grooves 116 which will engage the pins 93 of the mold train drive chain 92 in the beginning of the molding section so as to be driven at the desired rate through the molding section (and to push the other carriages 50 forward of the mold train drive 70).

A special carriage and track configuration for maintaining the proper alignment of the carriage body 52 is also provided and illustrated in FIGS. 4 and 5. This structure provides significant operational advantages to prevent the mold blocks from falling into a "sawtooth" type arrangement (with successive mold blocks being tilted slightly rather than perfectly aligned with the axis of the mold tunnel) as a result of potentially significant drag forces on the bottom of the mold blocks 30 through the molding section (as will become apparent).

Specifically, on each side of the carriage body 52, three rollers or wheels are provided: a set of axially aligned identical outer wheels 120 and an offset wheel 122 disposed between the outer wheels 120. The offset wheel 122 is secured to the carriage body 52 so that its lower surface (in the orientation shown in FIG. 5) is above the plane defined by the bottom surfaces of the outer wheels 120, and the upper surface of the offset wheel 122 projects above the plane defined by the upper surfaces of the outer wheels 120. The outer wheels 120 and offset wheel 122 are oriented so that the outer wheels 120 are both spaced laterally from the carriage body 52 beyond the offset wheel 122. As a result of this orientation, through the molding section, the two outer wheels 120 follow a track 126 (shown in FIG. 4 and as ground lines in FIG. 5) only on one side (the bottom) and the offset wheel follows a track 128 (also shown in FIG. 4 and as a ground line in FIG. 5) on the opposite (top) side.

The above guide structure for the carriages 50 results in the desired precise wobble-free movement of the carriages 50 without sawtoothing in the molding section, which operation is accomplished without requiring that expensively tight tolerances be met in the manufacture of the corrugator 20. Specifically, if the wheels 120, 122 were all aligned with their axes in a plane, it would be necessary to manufacture opposite sides of a single track to extremely tight tolerances because, if such tolerances were not met, the wheels would encounter sections in which they would bind on both sides of the track rather than freely roll therein. Requiring that the wheels 120, 122 of the carriages 50 of the present invention engage a track on only one side ensures that the wheels 120, 122 will roll freely with no worry of binding.

Further, by laterally offsetting the offset wheel 122 from the outer wheels 120 (in addition to the "vertical" offset as oriented in FIG. 5), the offset wheel 122 may be kept clear of the general guide track of the full carriage path 32, including the semicircular paths at each end, where precise orientation of the carriages 50 and their associated mold blocks 30 is not required, and function only in the track 128 along the molding section where such precise positioning is desirable.

Finally, in addition to the above described wheel configuration, a flange 136 (see FIG. 4) projecting outwardly from the center of the continuous path 34 is preferably provided and received between pivotally mounted rollers 138 on the carriage 50 to ensure straight motion of the carriage 50 without lateral movement or twisting. This thus minimizes loading on the wheels 120, 122 to ensure smooth travel of the carriage 50 about its continuous path 32.

Reference will now be made to the detailed structure of one mold block 30 which will provide numerous advantages over prior art mold blocks, and which can most advantageously be used with the full structure described herein to accomplish the numerous advantages provided by the disclosed structure. Though only one mold block 30 is generally described below, it should be apparent from the above disclosure that the other mold block 30 in each pair would be substantially identical to (and turned 180 degrees from) the mold block 30 being described.

As best shown in FIGS. 6–11, the mold blocks 30 comprise a plurality of adjacent sub-blocks 204 adjoined so as to define a continuous corrugated surface 208 with alternating grooves 210 and lands 212 and substantially arcuate 180 degrees about the longitudinal axis 214 (see FIG. 7). The grooves 210 and lands 212 of each sub-block extend up to one complete wavelength (i.e., the width of one groove 210 and one land 212), so that when together, the mold block face defines a continuous corrugated surface through the mold tunnel 34.

Adjacent sub-blocks 204 are mated at their front end face 218 and the rear end face 220, respectively. The sub-blocks 204 defining the mold block 30 (three such sub-blocks are shown in FIGS. 7–8) are aligned by suitable dowels 224 (see FIG. 6) fitted into countersunk fastener passageways 228 of each pair of adjacent sub-blocks 204. Bolts 230 run coaxially through the dowels 224 the length of the mold block 30, and secure the sub-blocks 204 together by tightening of the bolts 230 and nuts 232 (the nuts and bolt heads reside in the outer fastener passageways in the end sub-blocks 204).

A vacuum passage is defined by a suitable arrangement of grooves in the sub-blocks connected to the corrugated surface and to vacuum ports. These vacuum passages may be formed in a manner substantially similarly to those shown in U.S. Pat. No. 5,059,109, the detailed disclosure of which is hereby incorporated by reference. Specifically, in the preferred embodiment, a plurality of slits 234 (one such representative slit 234 only being shown in FIGS. 6 and 7) are disposed at the grooves 210 of the sub-blocks 204 and are connected to a plurality of vacuum bores 236. The bores 236 are in turn in communication with semicircular grooves 238 cast in the end faces 218, 220 of each sub-block 204 which, when the sub-blocks 204 are secured together as described above define a continuous circular vacuum passage. When adjacent mold blocks 30 are closed, a similar vacuum passage is created between the adjacent mold blocks 30. These vacuum passages are open through ports 240 to the outside of the mold blocks 30. This arrangement of grooves 210 and lands 212 within each sub-block 204 permits the dedication of a vacuum passage to each groove 210 of the corrugated surface 208, thereby inducing a strong, uniform vacuum at each groove 210 of the mold tunnel 34.

As will be understood by a skilled artisan, mold blocks of the present invention could also be made with semicircular grooves in only one end face of each sub-block 204. Similarly, it will be understood by a skilled artisan that the interior face slits could directly communicate with the semicircular groove in the sub-block end faces, and that the semicircular grooves could be less than 180 degrees, and in fact non-connected arcuate grooves can be used with systems where more than one vacuum source is provided. Still further, the mold blocks of the present invention could also be practiced by using sub-blocks which are arcuate through less than 180 degrees (for example, a single large mold block could also be formed by suitably rigidly connecting together sub-blocks which are not more than one complete wavelength long but have faces curving only 90 degrees). It should be understood, however, that the disclosed structure is believed to be the preferred embodiment most suitable for common usages.

The sub-blocks 204 further include a double groove 250 in their end faces, which grooves are connected at one end and, at their other end are connected to respective input ports 254 for cooling water and output or discharge ports 256. The double grooves 250 thus define cooling water passages about the mold blocks 30 to allow the blocks to be continuously used without overheating (which could degrade the quality of thermoplastic tube being made).

A sealing groove 260 is also provided in the sub-block end faces 218, 220 surrounding the cooling water double grooves 250 on the interior faces of the sub-blocks 204. A suitable seal 262 (see FIG. 11), such as an elastomeric O-ring, is disposed in the sealing groove 260 so as to prevent leakage of cooling water from the interior cooling water passages, In the outer faces of the mold blocks 30, the double groove 250 defining the cooling water passage is preferably provided with a suitable closing in order to ensure against water leakage between adjacent mold blocks 30 in the mold train 34. Two different structures for providing such operation are shown in FIGS. 9 and 10. Specifically, as shown in FIG. 9, the double groove 250 may further include recesses 270 in the side walls of the groove 250, with the flange 272 separating the double groove 250 through most of its length recessed and an annular sealing plate 274 may be slid into and suitably secured in the side wall recesses 270. Alternatively, as shown in FIG. 10, the side wall recesses 270' may be open and the annular sealing plate 274 simply placed in the recesses and secured therein by a suitable adhesive such as Loctite.

The above described mold block structure will thus draw a strong and uniform vacuum about the mold tunnel in order to properly conform the thermoplastic to the desired corrugated tubular shape, while at the same time permitting adequate cooling during operation. Further this can all be accomplished with a mold block having minimal complexity and cost.

It should be noted that the two mold blocks 30 forming a portion of the mold tunnel 34 could ideally be carried about one track in a clam shell type of operation such as disclosed herein in order to take full advantage of all aspects of the invention disclosed herein. However, it would still be within the scope of this aspect of the invention to use these mold blocks 30 in a system such as that shown in U.S. Pat. No. 4,319,872, with the two mold blocks of each pair carried on opposite endless tracks, mated together along a portion of the tracks to form a mold tunnel.

Figure 12:
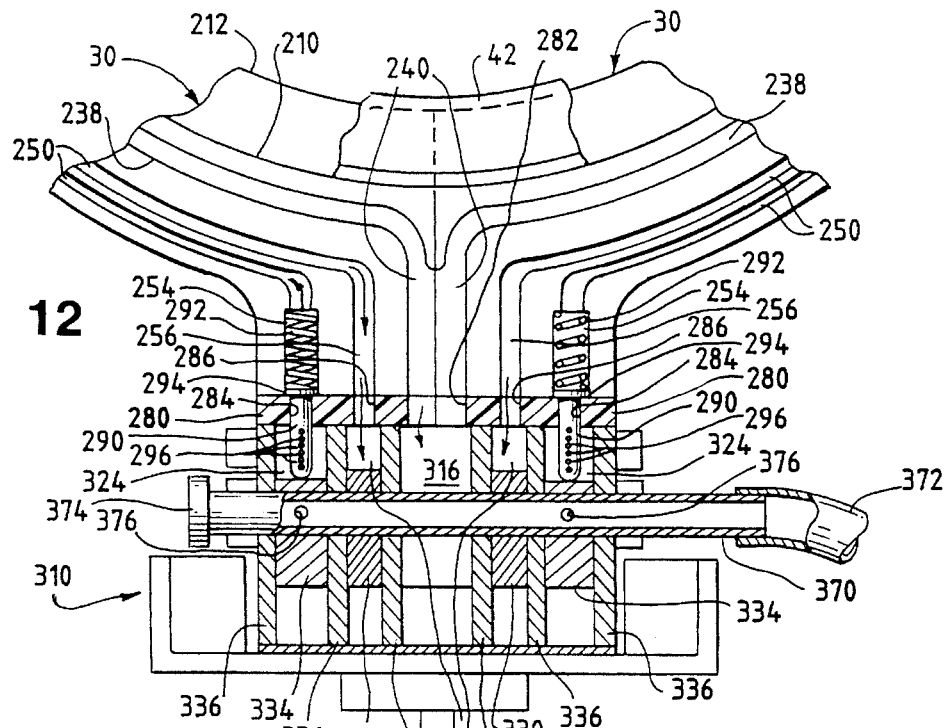
FIG. 12 is an end cross-sectional view of the supply tray and associated mold blocks in the molding section of the corrugator.

In the disclosed preferred embodiment of the mold blocks 30, a nylon plate or manifold 280 is suitably secured to the mold block exterior surface through which the various ports 240, 254, 256 are open (see FIGS. 8 and 12). The plate 280 includes openings 282, 284, 286 therethrough corresponding to the various ports 240, 254, 256.

Flow restricting hollow pins 290 (see FIG. 12) are disposed in the cooling water inlet ports 254, and are biased outwardly from those ports 254 by a suitable compression spring 292. The pins 290 are each open on their inner end and have an outwardly extending annular flange 294 at that end. The plate openings 284 corresponding to the cooling water inlet ports 254 have a slightly smaller diameter than the bore defining the inlet ports 254 so that the plate 280 and flange 294 cooperate to prevent the pins 290 from extending further from the mold blocks 30 than the positions shown in FIG. 12.

The pins 290 are each closed on their outer end and include a series of axially spaced openings 296 through their side wall. Accordingly, when the pins 290 are recessed in the nylon plate 280 with all of the side wall openings 296 covered, flow of water through the inlet port 254 is blocked. Further, the rate of cooling water flow through the inlet port 254 can be variably controlled by controlling the degree of extension of the pin 290 from the plate 280 to thereby control the number of exposed side wall openings 296.

A longitudinal supply tray or manifold 310 is adjustably supported in a horizontal orientation beneath the mold tunnel 34 (see FIGS. 1 and 2). This supply tray 310 defines five side-by-side channels along its length as best shown in FIGS. 12–15. The supply tray 310 is supported so that the mold blocks 30 moving along the molding section to define the mold tunnel 34 have their plates 280 disposed closely over or sliding on the top of the tray 310 so as to substantially enclose the channels Specifically, the supply tray 310 includes a central vacuum channel 316 which is connected to a suitable vacuum source and which is open along the length of the mold tunnel 34 to the mold block vacuum ports 240 (see FIGS. 12 and 13). Thus, this configuration draws air through the previously described vacuum passage connected to the interior of the mold tunnel 34 in order to uniformly draw the thermoplastic material 42 against the corrugated surface 208 of the mold blocks 30 to form the tube in the precise desired corrugated form about its periphery and along its length.

Disposed on either side of the central vacuum channel 316 are substantially identical cooling water discharge channels 320, and disposed outside those discharge channels 320 are substantially identical cooling water supply channels 324.

Figure 15:
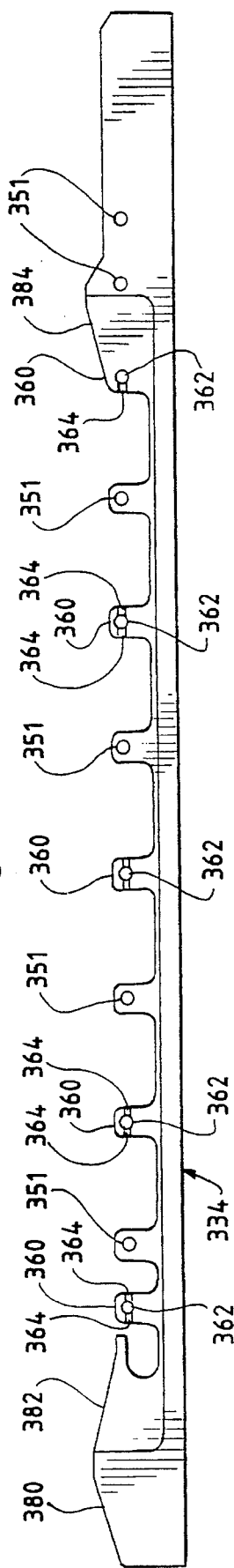
FIG. 15 is a side profile view of one of the water supply channels.
Figure 14:
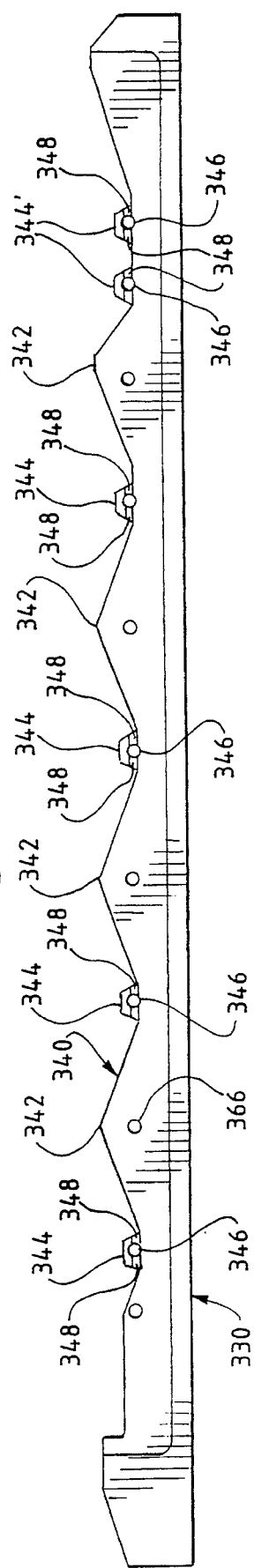
FIG. 14 is a side profile view of one of the water discharge channels.

The longitudinal profile of the cooling water channels 320, 324 is illustrated in FIGS. 14 and 15 respectively, which show the inserts 330, 334 secured between the side walls 336 of the respective channels 320, 324.

The insert 330 for each cooling water discharge channel 320 (see FIG. 14) defines a rolling bottom surface 340, the peaks 342 of which approach the plates 280 on the mold blocks 30 so as to define substantially separate segments along the length of the discharge channel 320.

The discharge channel insert 330 also includes a plurality of boss segments 344 along its length, which boss segments 344 include cylindrical bores 346 with radially aligned openings 348 extending from opposite sides of the bores 346. A tubular vacuum supply member 350 (see FIG. 13) extends through aligned openings through the width of the supply tray 310, including the bores 346 and bores 351 (see FIG. 15) in the supply channel insert 334, and is closed on one end and connected to a vacuum source on the other end. The supply member 350 is pivotable about its axis and includes radially aligned openings 352 (see FIG. 13) which may be aligned with the boss member openings 348 as desired to adjust the amount of vacuum drawn from the discharge channel 320 through the supply member 350. (The operation of this supply member 350 is substantially similar to the operation of the cooling water supply member shown in greater detail in the drawings and described below). As a result of the above configuration, the vacuum drawn in each segment along the length of each discharge channel 320 may be adjusted according to conditions to adjust the amount of cooling water circulated through the mold blocks 30. For example, during extended periods of operation or during use in hot environments, the vacuum may be maximized along the full length of the channels 320, whereas short periods of use or use in colder environments might require less cooling.

The cooling water supply insert 334 (see FIG. 15) includes a plurality of boss segments 360 along its length. These boss segments 360 include cylindrical bores 362 with radially aligned openings 364 extending from opposite sides of the bores 362. A tubular cooling water supply member 370 (see FIGS. 12 and 13) extends through aligned openings through the width of the supply tray 310, including the supply insert bores 362 and aligned bores 366 in the discharge channel inserts 330 (see FIG. 14), and is closed on one end and connected to a water supply source 372 at the other end. The water supply member 370 is pivotable about its axis by manual turning of a handle 374 on the closed end, and includes radially aligned openings 376 which may be aligned with the boss member openings 364 as desired to adjust the level of water supplied along the length of the supply channel 324.

The cooling water supply insert 334 has tapered surfaces at each end of the supply channel 324 to define the ends of the water channel and further to guide the pins 296 of the mold blocks 30 as they pass through the molding section. Specifically, as a mold block approaches from the left of FIG. 15, the pin 296 rides up the tapered surface 380 (moving into its associated inlet port 254) to clear the closed end of the supply channel 324, and then is biased back down by the spring 292) as it moves along the downwardly sloped surface 382 until it ultimately extends into the water in the supply channel 324 (as shown in FIG. 13) as it thereafter moves along the molding section.

Figure 13:
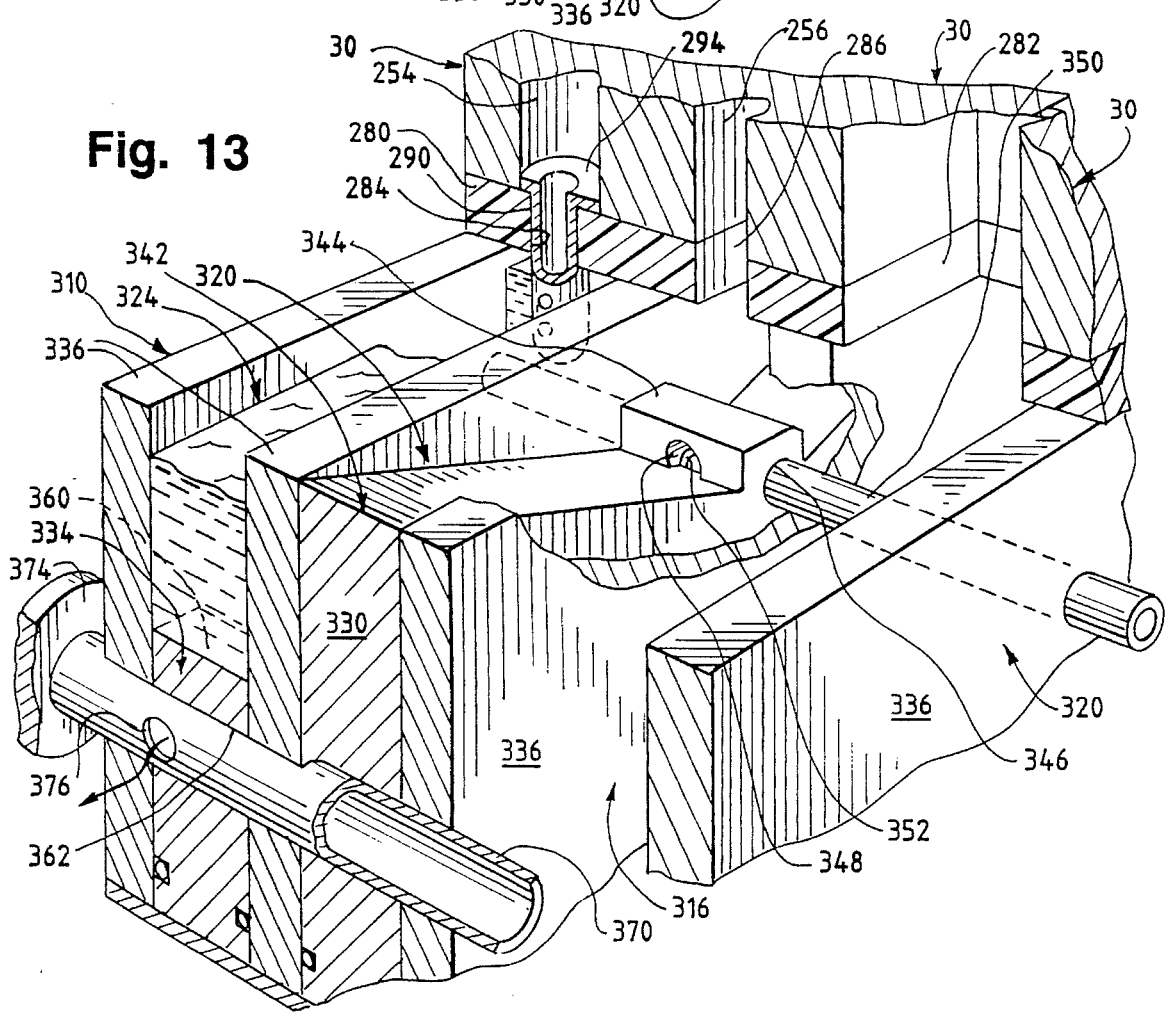
FIG. 13 is a perspective cross-sectional and partially broken away view of the supply tray and an associated mold block in the molding section.

In the configuration along the molding section as shown in FIG. 13, the pin openings 296 are disposed in the cooling water in the supply channel 324 to facilitate drawing of water through the cooling water passage defined by the double grooves 250. That is, with this configuration, the vacuum drawn through the discharge channel 320 sucks water directly into the openings 296 and through the previously described cooling water passages in the mold blocks 30. Since the pin openings 296 are submerged in the water, only water will be drawn through the cooling water passages (i.e., there is no need to completely fill the channel 324 with water).

At the end of the water supply channel 324, another tapered surface 384 is provided to push the pins 290 back up into their associated inlet ports 254 so that they will clear the closed end of the channel 324.

It may also be noted from a comparison of FIGS. 14 and 15 that the length of the cooling water supply channel 324 may be slightly shorter than the discharge channel 320. Thus, along this last section of the supply tray 310, the vacuum may be drawn from suitable vacuum supplies at boss segments 344' without drawing further water into the cooling water passages in order to empty out the water to prevent cooling water leakage.

As previously discussed, different diameter mold blocks 30 for making different diameter tubes are preferably mounted in a manner which will all use the same central axis 60 of the mold tunnel 34. Accordingly, it is necessary that the supply tray 310 be adjustable in height in order to be able to properly mate with the varying heights of the mold block plates 280 of different sizes. A scissors jack 390 (see FIGS. 1 and 2) has been found to be particularly suitable for use in adjusting the height of the supply tray 310, as the jack 390 will not only support the substantial weight of the tray 310, but also takes up minimum space beneath the tray 310 so as to allow a wide range of height adjustments.

It should thus now be apparent to a person of ordinary skill in this art that the above described corrugator 20 will provide ideal operation to reliably make corrugated tubes from thermoplastic materials at low cost. Still other aspects, objects, and advantages of the present invention can be obtained from a study of the specification, the drawings, and the appended claims.

We claim:

1. A machine for making plastic tubing, comprising:

first and second guide tracks on the machine defining a continuous path;

a third guide track associated with and facing oppositely to the first track through a path molding section of the continuous path;

a fourth guide track associated with and facing oppositely to the second track through the path molding section of the continuous path;

a plurality of carriages for carrying mold blocks about the continuous path of said machine, each of said carriages carrying a pair of mold blocks pivotable about an axis into mating engagement with one another along the molding section of the continuous path to form an axial portion of a mold tunnel in the molding section and including a carriage body including a pivot about which mold block pairs may be pivoted into and out of mating engagement, the axis of said pivot being substantially parallel to the path of travel of the carriage, first and second wheels on one side of said carriage body, said first and second wheels rotating about substantially parallel axes and riding only on the first track through the path molding section, third and fourth wheels on the other side of said carriage body, said third and fourth wheels rotating about substantially parallel axes and riding only on the second track through the path molding section, a fifth wheel on said one side of said carriage body and disposed between said first and second wheels with an axis of rotation spaced from a plane defined by the axes of rotation of said first and second wheels, said fifth wheel riding only on the third track through the molding section, and a sixth wheel on said other side of said carriage body and disposed between said third and fourth wheels with an axis of rotation spaced from a plane defined by the axes of rotation of said third and fourth wheels, said sixth wheel riding only on the fourth track through the path molding section.

2. A machine for making plastic tubing through a molding section, comprising:

first and second guide tracks on the machine defining a continuous path including a molding section, said first guide track extending a first direction along said molding section and facing a second direction substantially normal to said first direction along said molding section;

a third guide track associated with and facing oppositely to the first track through the molding section of the continuous path;

a plurality of carriages for carrying mold blocks about the defined continuous path, each of said carriages carrying at least one mold block about said continuous path and positioning said at least one mold block into engagement with another mold block along the molding section to form an axial portion of a mold tunnel in the molding section and including a carriage body securable to said at least one mold block, wherein said carriage bodies cooperatively position said mold blocks along said molding section to form a molding tunnel, first and second wheels on one side of said carriage body, said first and second wheels rotating about substantially parallel axes and riding only on the first track through the molding section, third and fourth wheels on the other side of said carriage body, said third and fourth wheels rotating about substantially parallel axes and riding only on the second track through the molding section, and a fifth wheel on said carriage body and disposed between said first and second wheels least one of said second and fourth wheels relative to the direction of travel wherein said fifth wheel rides only on the third track through the molding section.

3. The machine of claim 2, wherein:

said first and second wheels have substantially the same diameter; and said third and fourth wheels have substantially the same diameter.

4. The machine of claim 3, wherein said second guide track extends in the first direction along the molding section and faces a third direction substantially normal to said first direction along said molding section, and further comprising:

a fourth guide track associated with and facing oppositely to the second track through the molding section, wherein said third track is disposed adjacent said first track along one side through the molding section and said fourth track is disposed adjacent said second track along the other side through the molding section; and a sixth wheel on said carriage body and disposed between said third and fourth wheels, wherein said sixth wheel rides only on the fourth track through the molding section.

5. The machine of claim 4, wherein the diameter of the first, second and fifth wheels is less than the spacing between the first and third tracks through the molding section, and the diameter of the third, fourth, and sixth wheels is less than the spacing between the second and fourth tracks through the molding section.

6. The machine of claim 5, wherein the axis of rotation of the fifth wheel is substantially parallel to the axes of rotation of the first and second wheels and is offset from a plane defined by the first and second wheel axes; and the axis of rotation of the sixth wheel is substantially parallel to the axes of rotation of the third and fourth wheels and is offset from a plane defined by the third and fourth wheel axes.

* * * * *

UNITED STATES PATENT AND TRADEMARK OFFICE
CERTIFICATE OF CORRECTION

PATENT NO.    : 5,489,201
DATED         : February 6, 1996
INVENTOR(S)   : John S. Berns and Heinrich Dickhut It is certified that error appears in the above-identified patent and that said Letters Patent is hereby corrected as shown below:

<u>Column 12,</u>
Lines 44-46, delete "least one of said second and fourth wheels relative to the direction of travel".

Signed and Sealed this

Eleventh Day of March, 2003

JAMES E. ROGAN
*Director of the United States Patent and Trademark Office*